(12) United States Patent  (10) Patent No.: US 7,755,831 B2
Filipovich et al.  (45) Date of Patent: Jul. 13, 2010

(54) NIGHT VISION GLASSES

(75) Inventors: Danny Filipovich, Lincolnwood, IL (US); Jack C. Fiore, Inverness, IL (US); Eric Ford, Shadow Hills, CA (US)

(73) Assignee: Day and Night Display Systems, Inc., Lincolnwood, IL (US)

( * ) Notice: Subject to any disclaimer, the term of this patent is extended or adjusted under 35 U.S.C. 154(b) by 0 days.

(21) Appl. No.: 12/497,645

(22) Filed: Jul. 3, 2009

(65) Prior Publication Data

US 2009/0284832 A1  Nov. 19, 2009

Related U.S. Application Data

(63) Continuation of application No. PCT/US2009/044413, filed on May 18, 2009.

(60) Provisional application No. 61/053,843, filed on May 16, 2008.

(51) Int. Cl.
G02B 17/00 (2006.01)
(52) U.S. Cl. ............... 359/364; 359/630; 359/631; 359/633; 250/214 LA
(58) Field of Classification Search ............... None
See application file for complete search history.

(56) References Cited

U.S. PATENT DOCUMENTS

| 4,000,419 | A |   | 12/1976 | Crost et al. |
| 4,266,848 | A |   | 5/1981  | Schlegel |
| 4,465,347 | A | * | 8/1984  | Task et al. ............ 359/400 |
| 4,468,101 | A | * | 8/1984  | Ellis ...................... 313/524 |
| 4,629,295 | A | * | 12/1986 | Vogl ...................... 359/364 |
| 4,653,879 | A |   | 3/1987  | Filipovidh |
| 4,689,834 | A |   | 9/1987  | McCarthy et al. |
| 4,775,217 | A | * | 10/1988 | Ellis ...................... 313/524 |
| 4,915,487 | A |   | 4/1990  | Riddell, III et al. |
| 5,079,416 | A |   | 1/1992  | Filipovich |
| 5,229,598 | A |   | 7/1993  | Filipovich |
| 5,537,261 | A | * | 7/1996  | Palmer .................. 359/819 |
| 6,088,165 | A | * | 7/2000  | Janeczko et al. ...... 359/629 |
| 6,198,090 | B1 |  | 3/2001  | Iosue |
| 6,560,029 | B1 |  | 5/2003  | Dobbie et al. |

* cited by examiner

*Primary Examiner*—Arnel C Lavarias
(74) *Attorney, Agent, or Firm*—Matthew R. Schantz; Daniel L. Boots; Bingham McHale LLP

(57) ABSTRACT

Image-intensifying glasses 100 that are suitable for certain commercial and entertainment applications by virtue of their light weight, small size, and economical production, compared to certain other night vision products. In one disclosed embodiment, input light passes through two Amici prisms 144 and 148 and a field-flattening lens 150 to reach an image intensifier 152. The intensified image it produces is reflected off a first folding mirror 162, passes through a lens 154, reflects off a curved mirror 156, and passes back through the lens 154 the other way. The intensified image then passes through two additional, non-doublet lenses 158 and 160, between which an intermediate image exists. The intensified image then reflects off the "lens," or visor 130, of the glasses and proceeds to the pupil of eye 131 of the wearer. Alternative embodiments use a helmet visor, mirror, or other (at least partially) reflective surface for the final reflection.

12 Claims, 4 Drawing Sheets

NIGHT VISION GLASSES

REFERENCE TO RELATED APPLICATIONS

This application claims priority to U.S. Provisional Application No. 61/053,843, titled "Night Vision Glasses," and filed May 16, 2008. This application is also related to U.S. application Ser. No. 12/404,087, titled "Visor Heads-Up Display," and filed Mar. 13, 2009, and U.S. Provisional Application No. 61/036,281.

FIELD

Some embodiments disclosed herein relate to optical systems and elements, and in particular to a system having significant infrared properties and a folded optical path, forming night vision glasses that provide the wearer with an intensified image of the real world.

DESCRIPTION

Figure 1:
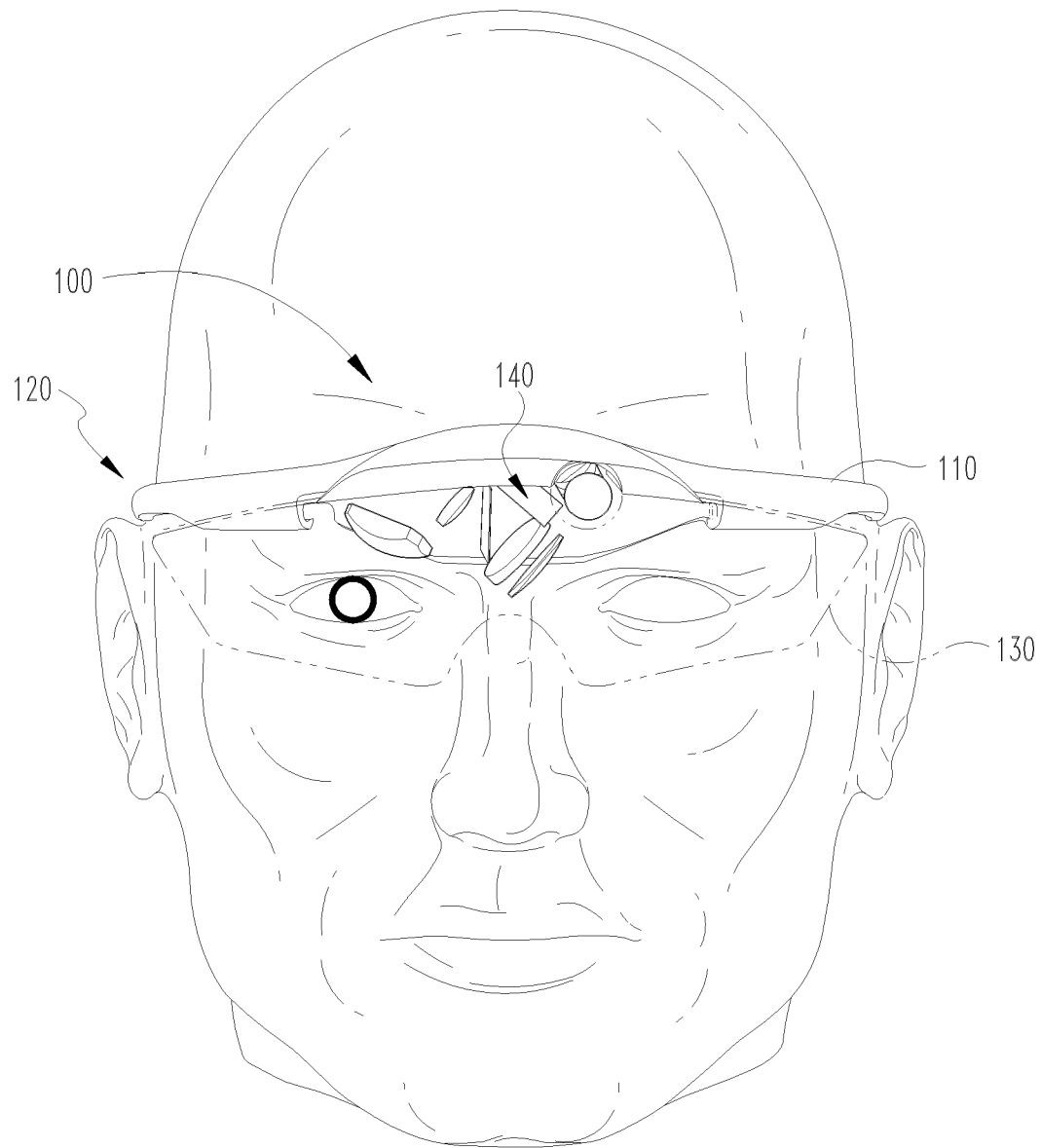
FIG. 1 is a front view of a pair of night vision glasses according to one embodiment.

For the purpose of promoting an understanding of the principles of the present invention, reference will now be made to the embodiment illustrated in the drawings and specific language will be used to describe the same. It will, nevertheless, be understood that no limitation of the scope of the invention is thereby intended; any alterations and further modifications of the described or illustrated embodiments, and any further applications of the principles of the invention as illustrated therein are contemplated as would normally occur to one skilled in the art to which the invention relates.

For many years, night vision technology has enabled military personnel to view scenes in very low light conditions. However, many night vision systems had weight distributions and overall bulk that made them unsuitable for many applications, such as many civil and entertainment applications. These systems required additional support, which frequently came from an external structure (such as a vehicle frame), a pilot's helmet, or one or both of the user's hands.

Generally, one form of the system disclosed herein is a pair of glasses that includes night vision technology to provide an intensified image to the wearer. Various embodiments are mounted on eyeglasses or other eyewear, and are balanced and light enough to stay on the user's face. Other forms include wrap-around glasses, helmet-based forms, mirror-based forms, and other embodiments that will occur to those skilled in the art in view of this disclosure. For clarity, the word "visor" will be used to refer to the object that is within the view of the wearer, and off which the generated image(s) reflect(s), though that object might just as well be a lens, mirror, or other (at least partially reflective) object, whether or not the word "visor" would typically be used to describe it.

Turning to FIG. 1, night vision glasses 100 comprise a frame 110, stems 120, an optical module 140, and a visor 130 as are customary or desirable. Optical module 140 converts received low light level energy into visible light that is seen by the wearer as an enhanced image reflected off the surface of the visor 130.

Figure 2:
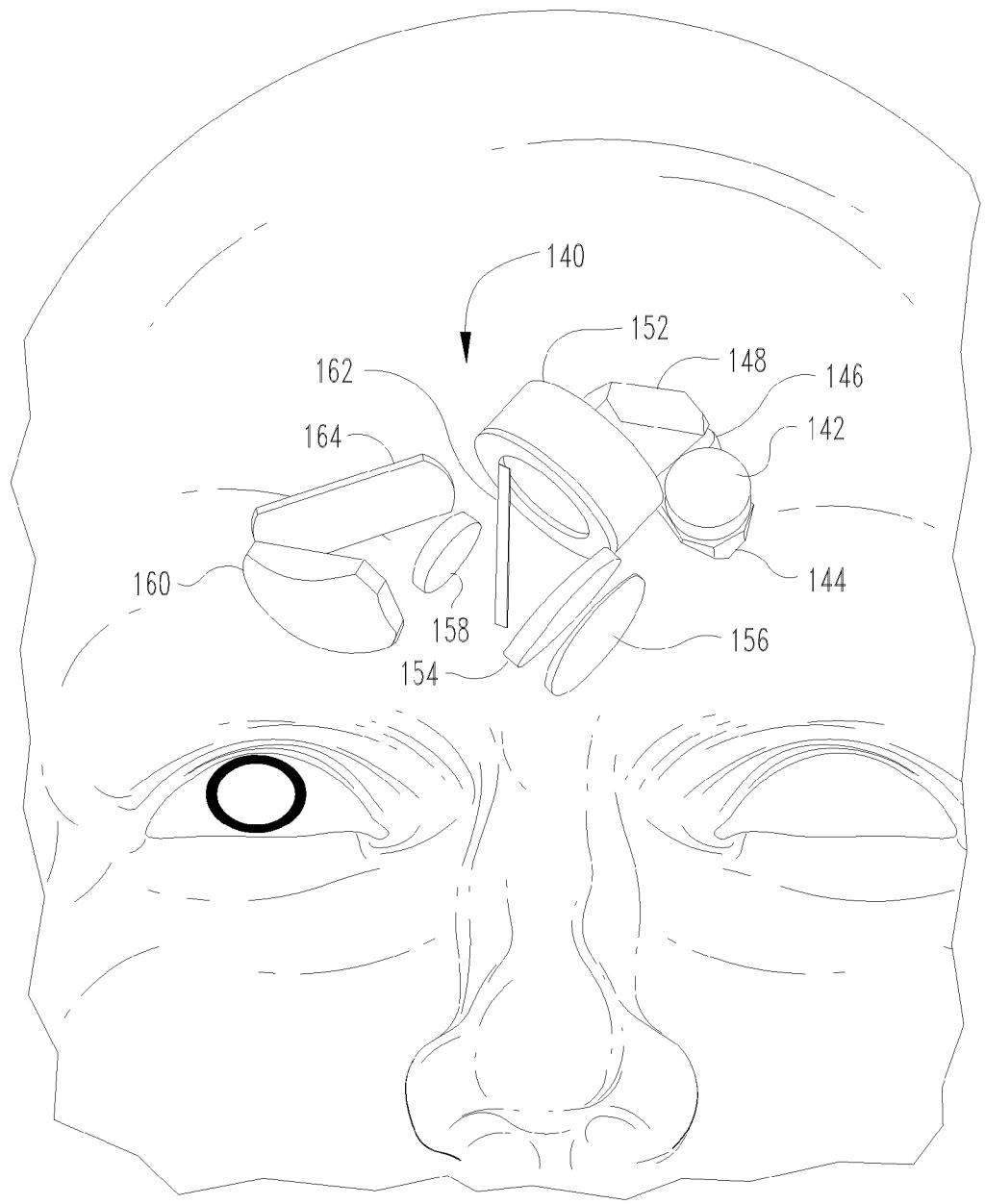
FIG. 2 is a front view of the optical arrangement according to the embodiment of FIG. 1.
Figure 3:
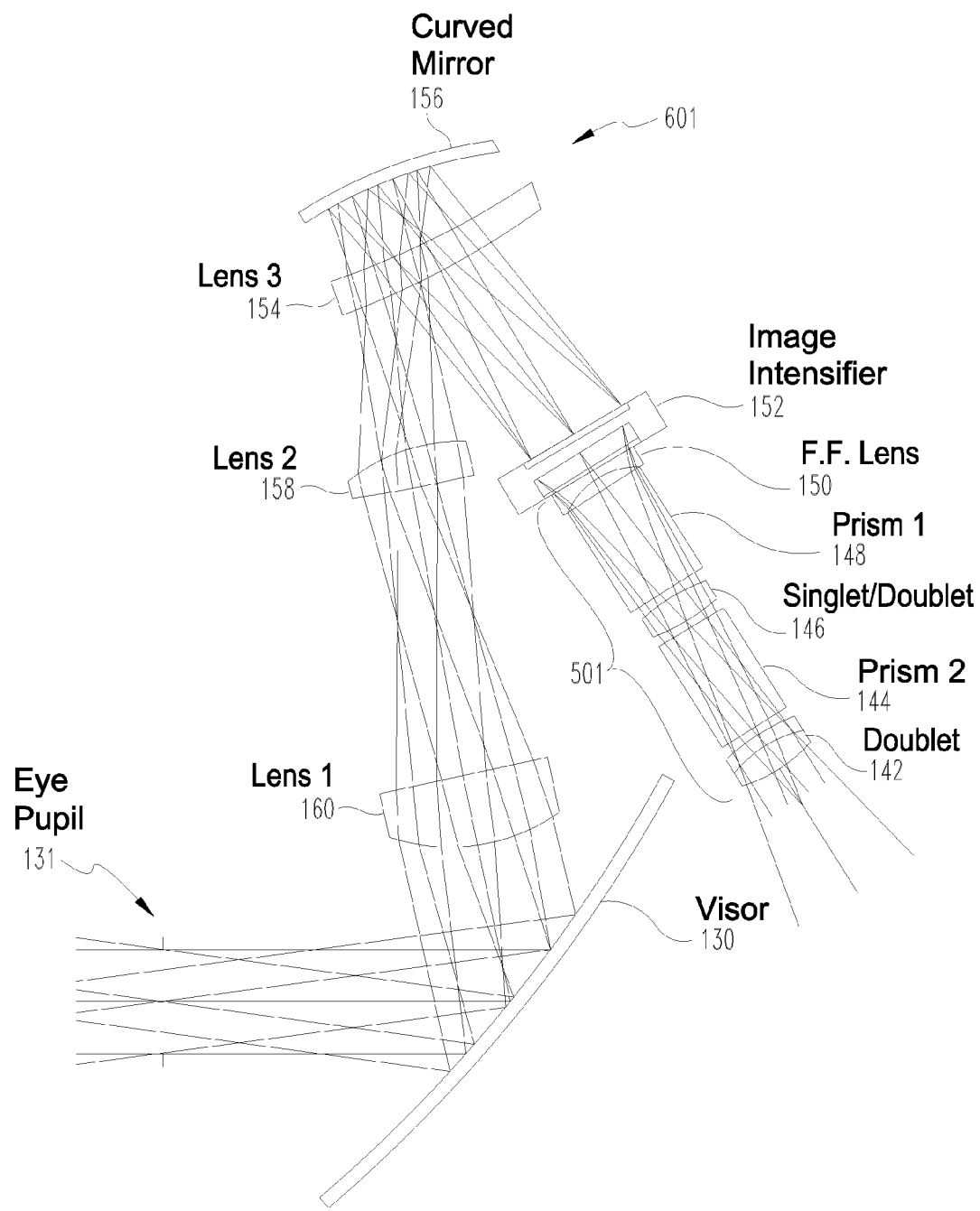
FIG. 3 is a schematic view of the optical system in the embodiment of FIG. 1, unfolded at two planar fold mirrors and at two fold prisms for clarity.

The components of optical module 140 are illustrated in more detail pictorially in FIG. 2 and schematically in FIG. 3. The optical module 140 comprises an objective lens subsystem 501, an image intensifier 152, and an eyepiece lens subsystem 601. The objective lens subsystem 501 comprises doublet 142, fold prism 144, singlet or doublet 146, fold prism 148, and field flattener lens 150; whereas the eyepiece lens subsystem 601 comprises flat mirror 162, lens 154, curved mirror 156, lens 158, flat mirror 164, and lens 160.

In this embodiment, optical module 140 contains a total of five optical folds: two in the objective lens subsystem 501 and three in the eyepiece lens subsystem 601. In addition to the folds in the optical module 140, one additional fold is provided by visor 130 resulting in a total of six folds. These six folds are even in number and, therefore, maintain the correct handedness (reversion) of the image with respect to the real world. The image intensifier 152 is made with a simple glass window output and, therefore, the image seen through objective lens subsystem 501 and eyepiece lens subsystem 601 would not be properly oriented due to the normal image rotation of the objective lens subsystem 501. To correct this, two modified Amici, or "roof," prisms 144 and 148 are utilized to rotate the objective image back by 180 degrees and provide proper orientation as seen by the eye.

As shown in FIGS. 2 and 3, a doublet 142 receives light from in front of the wearer. The light passes through fold prism 144, a singlet or doublet 146, and another fold prism 148 onto a field-flattening lens 150 and into the cathode (input) window of image intensifier 152. In this embodiment, prism 144 and prism 148 are modified Amici, or "roof," prisms and, in combination with the doublet 142, singlet or doublet 146, and field flattener 150, focus an image on the image intensifier 152 with the correct position and orientation. It will be clear to those skilled in the art in view of this disclosure that other embodiments may employ simple Amici reflectors made up of simple, front surface mirrors instead of prisms. Note that, for clarity, the folds produced by fold prisms 144 and 148 are not shown in FIG. 3.

In this embodiment, the image intensifier 152 has a 12-13 mm diameter image format with a thin glass, second generation (multi-alkali) cathode window and a thin glass output window. Note that the fiber optic twister that is used for the output window in certain existing night vision devices adds considerable size and expense, but is not needed in the present embodiment because of the inversions achieved by the Amici prisms (or reflectors). Other types of image intensifiers might be selected for different variations on size, weight, cost, commercialization potential, power consumption, and daylight protection. While other anodes might be selected based on these and other design considerations, yet still retain the spirit of the present invention, glass-type output (anode) windows offer substantially higher transmission of light from the phosphor than military-type fiber-optics-based windows. In these embodiments, the higher transmission from the glass-type output window offsets some of the losses inherent with the use of smaller aperture objective lens and the lower gain of the second-generation image intensifier. Some embodiments, for example, provide 65-75% of the intensified field of view compared to some military night vision systems, but weigh only 1/10 of what those military night vision systems weigh.

The image produced by the image intensifier 152 passes through lens 154, a thin, plastic, meniscus-type "corrector" lens, both before and after it is reflected off a curved (e.g., spherical, aspheric, hyperbolic, elliptical, parabolic, or toroid-shape) mirror 156. In this embodiment, the combination of the mirror 156 and lens 154 corrects for astigmatism and distortion that is produced by the tilted spherical visor/reflector 130. The mirror 156 in this embodiment is preferably a spherical front surface mirror, but can also be a rear surface mirror so as to act as a Mangin mirror. It can be made of any suitable material, even plastic. Lens 158 in this embodiment is matched with lenses 160 and 154 to place and collimate the intensified image at the pupil 131 of the user's eye. Lenses 160, 158, and 154 are plastic lenses in this embodiment, and an intermediate image appears between lens 160 and lens 158. The various lenses and mirrors of the system can be made of glass, plastic, or any other suitable material. Employing a combination of different plastics for the various lenses and mirrors provides good achromatization of the system, reducing the need for bulkier, heavier glass-type achromats. Note that, for clarity, the folds produced by planar mirrors 162 and 164 have been removed from the schematic view shown in FIG. 3.

Finally, the image reflects off the visor 130 of the night vision glasses 100 and to the pupil 131 of the observer. Visor 130 in this embodiment is spherical, though in other embodiments it can be aspheric, parabolic, or toroidal in shape, or still another shape as will occur to those skilled in the art. Further, visor 130 in this embodiment normally has uniform reflectivity, partial reflectivity, or reflectivity that varies vertically as in the lenses of some conventional sunglasses. The design with a spherical visor is more flexible and less sensitive to minor variations in manufacturing than certain other designs.

Lenses 154 and 160 are preferably made of a light plastic material, such as acrylic or polycarbonate, though other lens materials can be used as will occur to those skilled in the art. Likewise, mirror 156 may be spherical, aspheric, parabolic, toroidal, or another shape to form a suitable combination with lens 154 and the rest of the system. In various embodiments, mirror 156 is made of plastic, glass, metal, or other materials as will appear to those skilled in the art. Mirrors 156, 162, and 164 may even be made using a replication process.

Lens 158 is preferably a polystyrene or polycarbonate type of plastic. Some of these plastic materials are made/distributed by companies such as General Electric. Other lenses may be used in other embodiments, as will occur to those skilled in the art.

Visor 130 is also preferably plastic and in various embodiments is tinted, untinted, treated with variable and/or light-sensitive dynamic tinting, or coated with a thin film reflection coating on one side. This thin film could be applied to a whole side, or to just a patch. The visor 130 is preferably made of polycarbonate plastic or another shatterproof material for improved eye safety, and is attached to the frame 110 using any of a variety of means that will occur to those skilled in the art.

Figure 4:
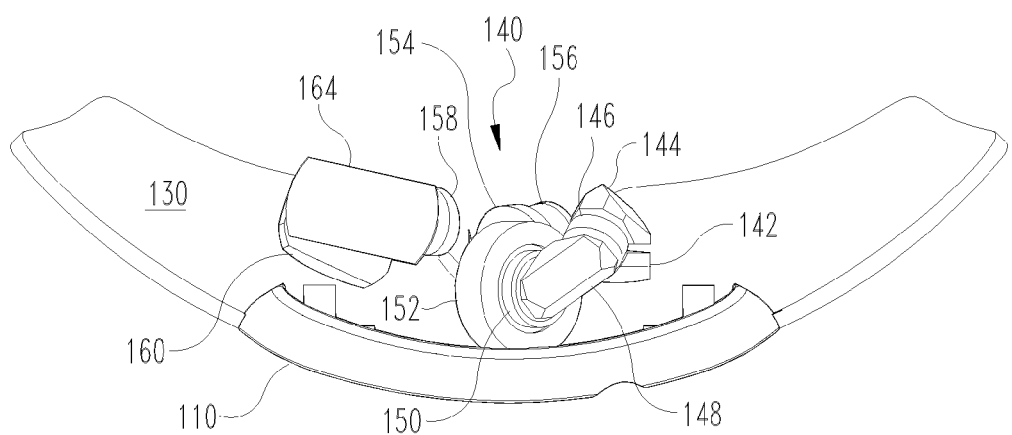
FIG. 4 is a top view of optical arrangement of the embodiment of FIG. 1.
Figure 5:
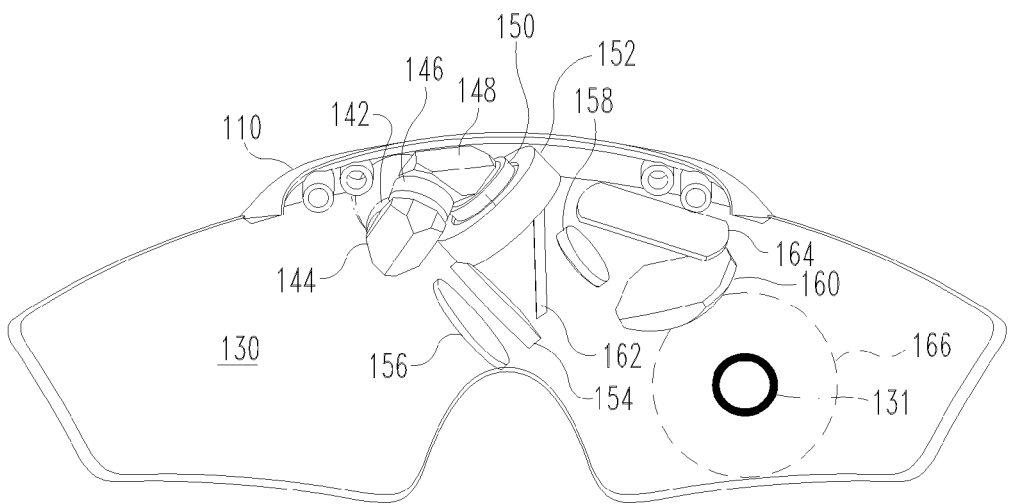
FIG. 5 is a rear view of optical arrangement in the embodiment of FIG. 1.

FIG. 4 shows a top view of the optical arrangement of night vision glasses 100 in one embodiment of an optical system for projecting an intensified image onto the right side of the glasses as viewed from the rear, while FIG. 5 shows a rear view of the same embodiment. The various optical folds throughout the optical system achieve improved spatial compactness. In particular, this embodiment includes planar folding mirrors 162 and 164, curved mirror 156, and fold prisms 144 and 148. As shown in FIG. 4, the intensified image reflects off region 166 of visor 130 to a pupil 131 of a user.

To summarize, the embodiment illustrated in FIG. 1 includes an image intensifying system that uses an objective lens subsystem 501 that employs two Amici prisms or mirrors, an image intensifier that utilizes a simple glass output window instead of a fiber optic window, and an eyepiece lens subsystem 601 that, combined with the visor 130, projects the intensified image to the user's eye as described in U.S. Provisional Application No. 61/036,281 and U.S. patent application Ser. No. 12/404,087.

All publications, prior applications, and other documents cited herein are hereby incorporated by reference in their entirety as if each had been individually incorporated by reference and fully set forth. While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. Night vision glasses, comprising:
   a frame;
   a visor having a curved reflective surface;
   an objective lens subsystem, comprising elements:
      two Amici prisms,
      a doublet lens,
      an additional lens, selected from the class of lenses consisting of a singlet and a doublet, and
      a field flattener lens;
   an image intensifier that
      receives input light that has passed through each element in the objective lens subsystem and
      generates an intensified image; and
   an eyepiece lens subsystem;
   wherein the frame supports the objective lens subsystem, image intensifier, and eyepiece lens subsystem in relative positions so that the intensified image passes through the eyepiece lens subsystem, then reflects off the reflective surface of the visor to an eye of a user.

2. The glasses of claim 1, wherein the objective lens subsystem has an F/n aperture, where n is about 2.0 or greater.

3. The glasses of claim 1, wherein the objective lens subsystem does not rotate the image.

4. The glasses of claim 1, wherein the light path through the image intensifier does not include a fiber optic rotation.

5. The glasses of claim 1, wherein the image intensifier has a glass output window.

6. The glasses of claim 1, wherein the image intensifier is a second generation image intensifier.

7. Night vision glasses, comprising:
   a frame;
   a visor having a curved reflective surface;
   an objective lens subsystem, comprising elements:
      two Amici mirrors,
      a doublet lens, an additional lens, selected from the class of lenses consisting of a singlet and a doublet, and a field flattener lens;

an image intensifier that receives input light that has passed through each element in the objective lens subsystem and generates an intensified image; and an eyepiece subsystem;

wherein the frame supports the objective lens subsystem, image intensifier, and eyepiece subsystem in relative positions so that the intensified image passes through the eyepiece subsystem, then reflects off the reflective surface of the visor to an eye of a user.

8. The glasses of claim 7, wherein the objective lens subsystem has an F/n aperture, where n is about 2.0 or greater.

9. The glasses of claim 7, wherein the objective lens subsystem does not rotate the image.

10. The glasses of claim 7, wherein the light path through the image intensifier does not include a fiber optic rotation.

11. The glasses of claim 7, wherein the image intensifier has a glass output window.

12. The glasses of claim 7, wherein the image intensifier is a second generation image intensifier.

* * * * *

UNITED STATES PATENT AND TRADEMARK OFFICE
CERTIFICATE OF CORRECTION

PATENT NO. : 7,755,831 B2  
APPLICATION NO. : 12/497645  
DATED : July 13, 2010  
INVENTOR(S) : Filipovich et al.

Page 1 of 1

It is certified that error appears in the above-identified patent and that said Letters Patent is hereby corrected as shown below:

Title Page, Item (75) Inventors:

should read

-- (75) Inventors: Danny Filipovich, Lincolnwood, IL (US); Jack C. Fiore, Inverness, IL (US); Eric Ford, Shadow Hills, CA (US); Asaf Ashkenazi, Yaakov (IL) --.

Signed and Sealed this
Twenty-second Day of September, 2015

Michelle K. Lee
*Director of the United States Patent and Trademark Office*